United States Patent [19]

Krause et al.

[11] Patent Number: 4,795,256

[45] Date of Patent: Jan. 3, 1989

[54] DUAL-WAVELENGTH SPECTROPHOTOMETRY SYSTEM

[75] Inventors: Andrew W. Krause, Baltimore, Md.; Charles G. Marianik, Plainsboro, N.J.; Ronald J. Kovach, Langhorne, Pa.

[73] Assignee: Photon Technology International, Inc., Princeton, N.J.

[21] Appl. No.: 23,567

[22] Filed: Mar. 9, 1987

[51] Int. Cl.$^4$ .................... G01J 3/08; G01J 3/427; G01N 21/64

[52] U.S. Cl. .................... 356/320; 356/318; 356/325

[58] Field of Search ............... 356/317, 318, 320, 325

[56] References Cited

U.S. PATENT DOCUMENTS

| | | | |
|---|---|---|---|
| Re. 30,712 | 8/1981 | Macemon | 356/318 |
| 3,039,353 | 6/1962 | Coates et al. | |
| 3,658,422 | 8/1972 | Wilkinson | 250/226 |
| 3,666,362 | 5/1972 | Chance | 356/320 |
| 3,676,005 | 3/1972 | Chance | 356/320 |
| 3,897,154 | 7/1975 | Hawes | 356/51 |
| 4,022,529 | 5/1977 | White | 356/318 |
| 4,136,959 | 1/1979 | Honkawa et al. | 356/418 |
| 4,305,663 | 12/1981 | Perkins et al. | 356/323 |
| 4,455,097 | 6/1984 | Ichikawa et al. | 356/323 |
| 4,484,815 | 11/1984 | Akiyama et al. | 356/325 |

FOREIGN PATENT DOCUMENTS 2054010 5/1972 Fed. Rep. of Germany ...... 356/320

Primary Examiner—Vincent P. McGraw
Attorney, Agent, or Firm—Richard C. Woodbridge

[57] ABSTRACT

A dual wavelength spectrophotometer produces a relatively small, high power, high duty cycle light spot from a single relatively low power multi-chromatic light source. A Xenon arc lamp light source is focused by an ellipsoidal mirror onto a rotating partially reflective optical chopper. The chopper comprises a wheel having mirrored segments alternately separated by transparent segments. Light reflected by the mirrored segments passes through a first monochromator which produces a first monochromatic light beam. Light transmitted through the transparent segments passes through a second monochromator and emerges as a second monochromatic light beam having a wavelength different from the wavelength of said first monochromatic light beam. The first and second monochromatic light beams are recombined into a single dual wavelength light beam that is reflected through a sample to be analyzed. Reflective front surfaces are employed throughout the system in order to minimize power loss.

9 Claims, 5 Drawing Sheets

DUAL-WAVELENGTH SPECTROPHOTOMETRY SYSTEM

BACKGROUND OF THE INVENTION

1. Field of the Invention

This invention relates to dual wavelength spectrophotometers.

2. Description of Related Art

There are two primary methods for generating dual wavelength light beams for dual wavelength spectrophotometers. Those techniques are illustrated in FIGS. 1 and 2 labeled "Prior Art".

FIG. 1 illustrates a known technique in which two light sources $L_1$ and $L_2$ provide illumination respectively for monochromators $M_1$ and $M_2$ which are set at different wavelengths. The output beams of monochromators $M_1$ and $M_2$ are therefore at different wavelengths. A chopper C or optical modulator is then used to alternately allow the two different wavelengths to combine and illuminate a single sample. One of the major problems with the prior art technique illustrated in FIG. 1 is that the intensities of lamps $L_1$ and $L_2$ can never be perfectly matched. This results in a variation in illumination to the sample which can result in undesirable testing error.

FIG. 2 illustrates another known prior art technique which employs a single light source L. The multichromatic light from source L is divided by beam splitter BS and focused into two monochromators $M_1$ and $M_2$. An alternative embodiment of the technique illustrated in FIG. 2 is to position the two monochromators $M_1$ and $M_2$ to intercept light from the same source L, but at different sections of the illumination by positioning the monochromators at a 90 degree or 180 degree angle with respect to each other, thereby eliminating the need for a beam splitter. After the monochromators $M_1$ or $M_2$ select two different wavelengths, the outputs are combined by a chopper C or optical modulator causing the two beams to merge into a single beam alternating between the two wavelengths. One of the problems associated with the technique illustrated in FIG. 2 is that the beam splitter BS necessarily decreases the level of illumination available to monochromators $M_1$ and $M_2$. Therefore the level of illumination will be only approximately one-half of that available from individual light sources such as $L_1$ and $L_2$ shown in FIG. 1. Moreover, the beam splitter BS is not necessarily a perfect beam splitter. Therefore one direction might pass slightly more than 50% of the light beam and the other direction reflect slightly less than 50% of the light beam resulting in erroneous intensity readings at the output of the instrument. Similarly, positioning two monochromators at different angles (e.g. 90 or 180 degrees) with respect to the light source L may also result in unevenness due to the fact that the light is not a perfect light source and its intensity may vary from angle to angle and from time to time. Prior art dual wavelength techniques such as illustrated in FIG. 2 are also described in U.S. Pats. Nos. 3,676,005; 3,666,362 and 4,136,959.

The light source employed with dual wavelength spectrophotometers is an important consideration. A typical prior art light source is illustrated in FIG. 3. The lamp shown in FIG. 3 is positioned in front of a spherical mirror M to collect the light from behind the back of the lamp. A very fast lens $L_1$, such as an f.7 with a large diameter, for example four inches, is used to collect as much of the light as possible from the back collecting mirror and the front of the lamp. A second lens $L_2$ is necessary to slow the f number of the beam to that of the monochromator, which generally has an f number of 3.6 or slower.

The use of optical choppers in the context of dual beam or dual wavelength spectrophotometers is known. Many different types of choppers have been employed including vibrating shutters, vibrating gates, rotating mirrors, etc. The use of a partially mirrored, partially transparent optical chopper is disclosed in a number of prior art patents, including, but not limited to the following: U.S. Pat. Nos. 3,039,353; 3,658,422; 3,666,362; 3,676,005; 3,897,154; 4,305,663; 4,455,097 and 4,484,815.

Many systems employ lenses and other refractive optical elements. A few systems are known to use reflective optics in other contexts. See for example, U.S. Pat. No. 3,029,253 which discloses a dual beam spectrophotometer using reflective surfaces.

Insofar as understood, none of the prior art taken singularly or in combination suggests a dual wavelength spectrophotometer having substantially increased spot illumination and substantially reduced dead time as set forth in this disclosure.

SUMMARY OF THE INVENTION

Briefly described the invention comprises a dual wavelength spectrophotometer for producing a relatively small, high power, high duty cycle light spot from a single relatively low power multi-chromatic light source. A multi-chromatic xenon arc lamp light source is focused by an ellipsoidal mirror onto a rotating partially reflective optical chopper. The optical chopper comprises a wheel having five mirrored segments separated by five transparent segments respectively. The light spot is approximately 4 mm in diameter and is divided by a slot arc-length of approximately 28 mm. Therefore effective illumination measurements can be taken over better than 85% of the duty cycle of the chopper. Light reflected by the five mirrored segments passes through a first monochromator which produces a first monochromatic light beam. Light transmitted through the transparent segments pass through a second monochromator and emerges as a second monochromatic light beam having a wavelength different from the wavelength of the first monochromatic light beam. The first and second monochromatic light beams are reflected by off-axis paraboloidal collimating mirrors onto a coarse grating beam combiner which focuses the two alternating monochromatic light beams along the same path. Reflective surfaces are employed throughout the optics of the system in order to minimize power loss. A quartz window beam splitter, angled at 20 degrees with respect to the collimated dual wavelength light beam transmits a portion of the light into a quantum counter. The output beam can be directed either towards a standard fluorescent sample compartment or toward a microscope inspection station. Analysis carried on in both stations can be monitored by a microcomputer, such as an IBM-AT, which is employed to synchronize the optical chopper and to otherwise control, correct and compare the various functions carried on within the system.

These and other features of the invention will be more fully understood by reference to the following drawings.

DETAILED DESCRIPTION OF THE INVENTION

During the course of this description like numbers will be used to identify like elements according to the different figures which illustrate the invention.

Figure 1:
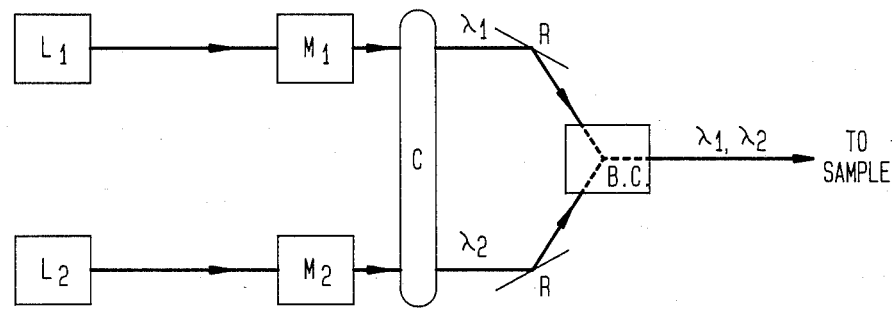
FIG. 1 illlustrates a prior art dual wavelength spectrophotometer employing a pair of multi-chromatic light sources.
Figure 2:
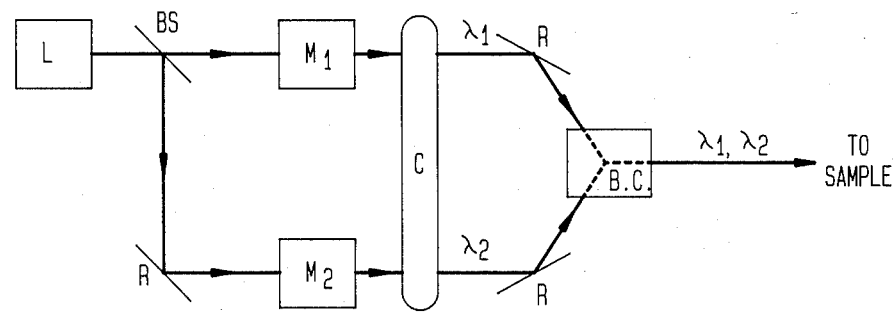
FIG. 2 illustrates another prior art dual wavelength spectrophotometer in which a single light source is divided by a beam splitter and subsequently recombined into a single collimated beam.
Figure 3:
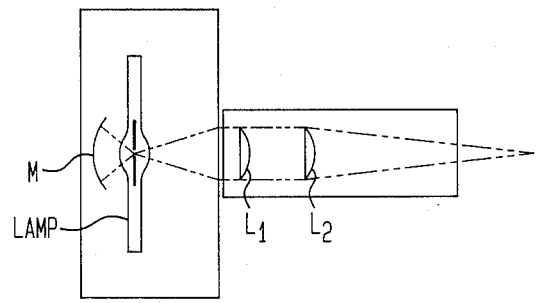
FIG. 3 illustrates a prior art light source such as employed in the systems illustrated in FIGS. 1 and 2.

Early prior art dual wavelength spectrophotometers have been discussed with regard to FIGS. 1 through 3. Unfortunately, the utility of the devices illustrated in FIGS. 1 through 3 is limited due to their relatively low duty cycle, low efficiency and poor spot illumination characteristics. The present invention overcomes those problems in a manner which will become clear after studying the following detailed description.

Figure 4:
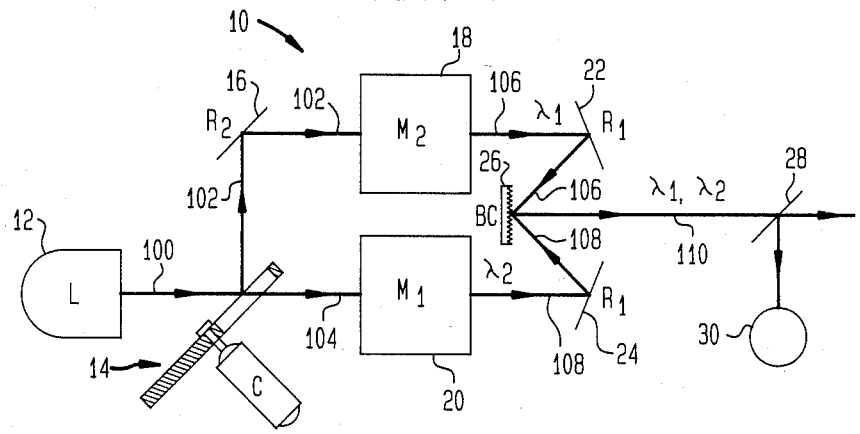
FIG. 4 illustrates a dual wavelength spectrophotometer according to the preferred embodiment of the invention.

The preferred embodiment of the invention 10 is illustrated in FIG. 4. A xenon light source at one focus of an ellipsoidal reflector 12 produces a multi-chromatic, light beam 100 which impinges upon a rotating optical chopper 14. Optical chopper 14 comprises a rotatable disc having five wedge-shaped mirrored segments 15 separated respectively by five transparent segments 17. Because of the ellipsoidal reflector the multi-chromatic light beam 100 has a spot diameter of under 4 mm that impinges on the edge of the rotating chopper disc. The fraction of each rotation cycle which defines the dead time of the system is equal to the light spot diameter (4 mm) divided by the slot arc-length (approximately 28 mm) over which the spot passes. Therefore, effective dual illumination measurements can optimally be taken at better than an 85% duty cycle with the full light intensity available during the illumination. However, at high alternating channel speeds the effective part of the duty cycle may be reduced by computer limitations. At chopper speeds of 900 Hz (translating to a slot exposure time of almost 0.5 msecond which is the illumination time for one channel) the effective part of the duty cycle becomes 75% if using an IBM-AT and 65% with an IBM-PC. The portion of the multi-chromatic light beam 100 which strikes a mirrored segment 15 (see FIG. 7) is reflected as a first multi-chromatic light beam 102 to mirror 16 ($R_2$) and from there into monochromator 18 ($M_2$). Conversely, the portion of the multi-chromatic light beam 100 which strikes a transparent segment 17 passes through the chopper 14 as a second multi-chromatic light beam 104 which is received by monochromator 20 ($M_1$).

Monochromators 18 and 20 employ a Czerny-Turner configuration. Monochromators 18 and 20 are adjacent for greater system compactness and are substantially identical even though different diffraction gratings could be provided for each. Both monochromators 18 and 20 are f/4 and have a focal length of 200 mm. Each monochromator 18 and 20 comes equipped with a 1200 lines/mm grating biazed at 400 nm when the system is specified for fura-2. This grating blaze is selected to permit the highest illumination possible in the smallest bandpass. Because the fura-2 is typically excited at 340 and 380 nm while a grating blazed at 400 nm permits its greatest light throughput.

Both monochromators 18 and 20 provide superior wavelength resolution (below a bandpass of 1 nm) with high light throughput. Narrow bandpasses are often required for preventing interference in many spectrophotometric applications. On the other hand, wide wavelength bandpasses are often undesirable because they may contain wavelengths that cause absorption or fluorescent emission to depend on extraneous unwanted factors. For example, certain regions of the excitation spectrum of many fluorophores shown significant dependance on particular environmental factors (such as pH, ionic strength, etc.) relative to other regions.

Monochromator 18 separates a first monochromatic light beam 106 from the first multi-chromatic light beam 102. Mirror 22 focuses the first monochromatic light beam 106 onto a coarse grating 26. Similarly, monochromator 20 separates a second monochromatic light beam 108 from the second multi-chromatic light beam 104. Mirror 24 reflects the second monochromatic light beam 108 onto coarse grating 26. Coarse grating 26 acts as a beam combiner which focuses the first and second monochromatic light beams 106 and 108 respectively and alternately along the same path forming a collimated output light beam 110 which alternates between the wavelength of the first monochromatic light beam 106 and the second wavelength of the monochromatic light beam 108. The collimated dual wavelength light beam 110 impinges upon quartz window beam splitter 28 that is angled at approximately 20 degrees with respect to collimated beam 110. A portion of dual wavelength light beam 110 is diverted by beam splitter 28 to reference cell quantum counter 30 which is connected to an IBM-PC or AT 80. The purpose of quantum counter 30 is to provide for correction of the excitation spectra. Reference quantum counter 30 preferably consists of a cuvette filled with a rhodamine 101 and a sensitive photodetector connected to an amplifier and a grated signal averager. The rhodamine 101 fluoesces in direct proportion to the energy (quanta) of the incident light independent of wavelength (from 200–600 nm). It requires only about 10% of the entire output of the illumination subsystem, as diverted by beam splitter 28 to sufficiently illuminate quantum counter 30. The signal from quantum counter 30 is fed into an analog-to-digital converter and then to the IBM-PC, XT or AT 80 for further processing. The reference cell quantum counter 30 has many uses. Its most important use is in correcting fluorescence excitation spectra. In doing so the computer 80 ratios the fluorescence intensity from a sample S under study to the quantum counter signal for a particular excitation bandpass. The invention 10 can perform this function for one or both channels of excitation. A true excitation spectrum is thus produced which is independent of instrument characteristics. This ability is highly useful, for example, in determining the quantum efficiency of a fluorescent dye.

The reference cell quantum counter 30 is also useful in making studies involving dual-excitation scanning more simple and precise. It can automatically correct for gradual shift in the relative intensities of two scanned excitation beams. Therefore there is no need for complicated, repeated calibrations. The quantum counter 30 can also be used to equalize the output intensity of the two channels of illumination. The relative signals monitored from the two channels 106 and 108 can be adjusted using mutual density filters or by changing the relative bandpasses by adjusting the relative slit widths 19, 21, 23 and 25 of monochromators 18 and 20. By radioing detected fluorescence to the quantum counter signal, the effects of minor fluctuations in illumination intensity can be corrected. The ability of reference cell quantum counter 30 to correct minor illumination instability can be important. Light intensity fluctuations from the source 12 can often be the limiting factor in detecting sample absorbance or fluorescence signals. This fact can be clearly illustrated with respect to fluorescent indicator dyes.

In the case of fluorescent indicator dyes such as fura-2, indo-1, or quin2 f or calcium, it is usually desirable to use only that intensity of excitation required to adequately monitor fluorescence. This prevents deleterious dye photobleaching which can obscure calcium measurements. Using low intensity UV excitation also limits photodamage to a living cell under study. Because these dyes may interfere with cellular processes, it may also be desirable to load the dyes into cells at low concentrations.

The combination of low intensity excitation with low dye concentration yields low fluorescence, albeit quite detectable by the ultrasensitive system 10 described herein. However, problems arise when noise, in the form of background fluorescence (cell autofluorescence) and excitation intensity fluctuation (resulting in concimitant dye fluorescence fluctuation) swamps the dye fluorescence signal of interest. Unchecked by feedback or data correction, this excitation intensity fluctuation can be the most limiting factor in observing useful signals. A discussion of this major source of signal noise in quin2 under epi-fluorescence microscopy is found in Rogers et al, "Intracellular pH and Free Calcium Changes in Single Cells Using Quene 1 and Quin 2 Probes and Fluorescence Microscopy", 1983, FEBS 161:21-27. Use of a sensitive quantum counter 30, such as described herein, effectively eliminates the problem described by Rogers et al.

Figure 5A:
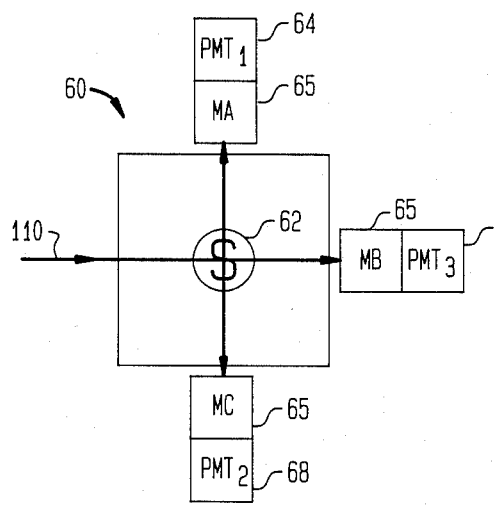
FIG. 5A illustrates a fluorescent sample compartment at the output of the preferred embodiment illustrated in FIG. 4.
Figure 5B:
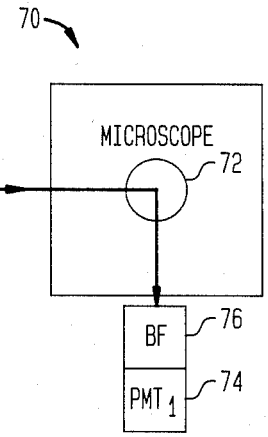
FIG. 5B illustrates a microscope illumination station such as might also be employed at the output of the preferred embodiment illustrated in FIG. 4.

The portion of the collimated dual wavelength light beam 10 that is not deverted to quantum counter 30 proceeds either to a fluorescent sample station 60 as illustrated in FIG. 5A or to a microscope inspection station 70 as illustrated in FIG. 5B. As shown in FIG. 5A, the fluorescent sample station 60 includes a small compartment 62 for holding a sample S of materials. Three photomultiplier tube detection stations 64, 66 and 66 (PMTI$_1$, PMTI$_3$ and PMT$_2$ respectively) are located at approximately 90 degrees with respect to each other and the sample compartment 62. The layout of fluorescence sample testing station 60 allows for the measuring of absorption, single and dual emission fluorescence, fluorescence of turbid samples, fluorescence polarization and temperature-dependent spectra. Fluorescence testing station 60 is adapted to collect the faintest light from a 10 mm$^2$ cuvette 62 at f/2.6 and then send it at f/4 to the f/4 entrance of an emission monochromator. The almost perfect matching of the sample compartment exit light cone with the entrance cone of the monochromators gives approximately 100% light transfer for maximum efficiency. Excluding the gratings, the emission monochromators are exactly the same as monochromators 18 and 20 illustrated in FIGS. 4 and 7. Only one monochromator is needed for use with fura-2, whereas two are required for indo-1. There is a wide selection of useful gratings. Gratings ruled at 1200 lines/mm are recommended which are blazed at 500 nm for fura-2 and at 500 nm and 400 nm for indo-1.

The invention 10 permits excitation and emission monochromators to be scanned individually or synchronously. Generally photon-counting detection is supplied with each emission monochromator. The detectors are preferably Hamamatsu R928 P multi-alkali photomultiplier tubes (PMT's) which are extremely sensitive from the UV to the infrared range (dark count less than 300 cps). Other PMT's are available for even higher density sensitivity in more restricted wavelength ranges. Each detection system includes an RFI shielded PMT housing, a high voltage power supply, and an amplifier-discriminator. A cooled housing can also be provided to reduce the PMT dark count.

Figure 8:
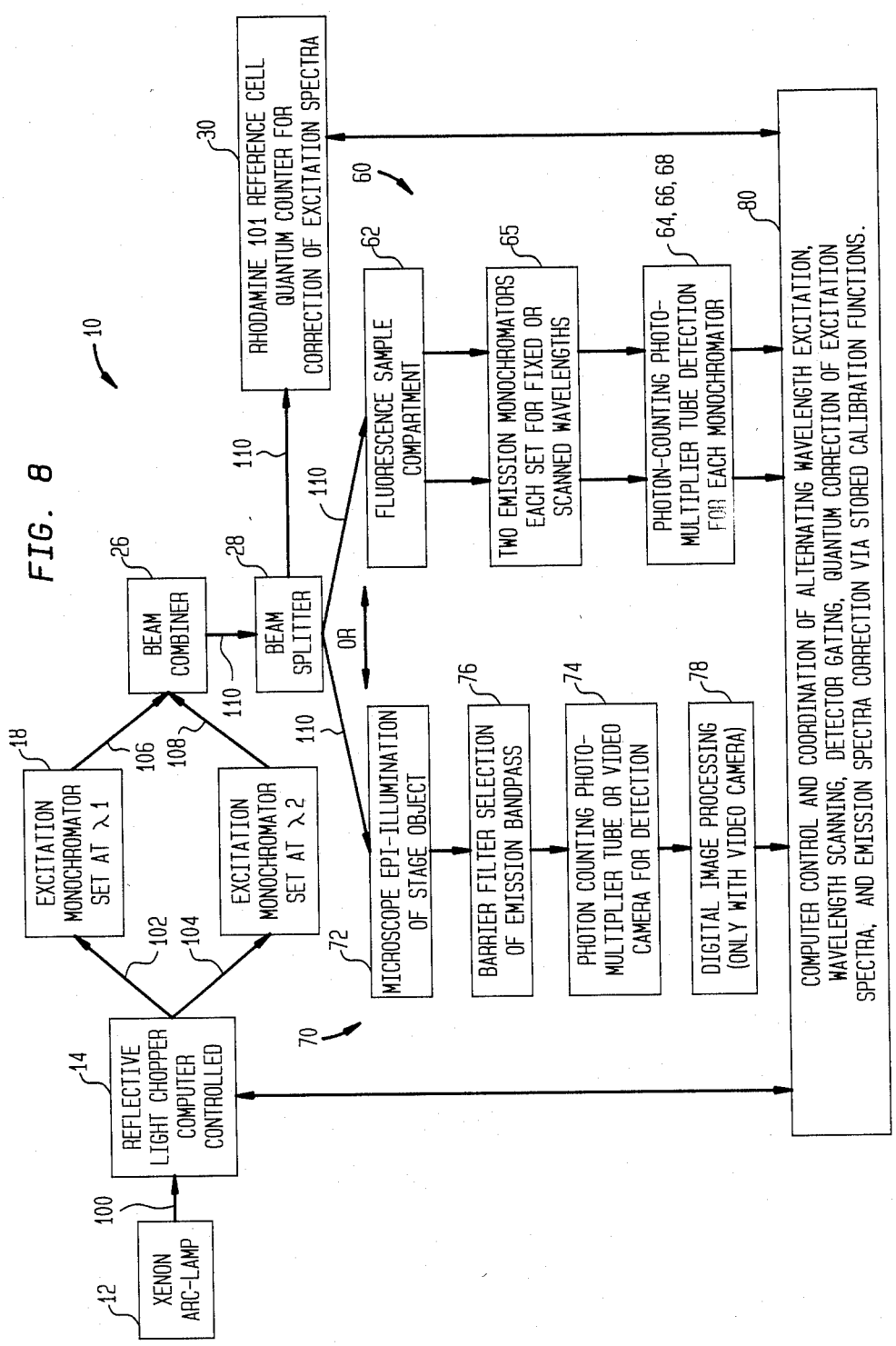
FIG. 8 is a schematic flow diagram of the preferred embodiment illustrated in FIG. 4.

The system 10 eliminates the need for expensive conventional photon-counting instruments. A Tecmar Lab Master and the computer 80 takes the TTL pulse from the amplifier-discriminator and converts it to the photocounting signal in counts per second (cps). Sample chamber 60 is also preferably supplied with a mechanical shutter at each detection port of PMT's 64, 66 and 68. The shutter preferably closes when the compartment is open to protect the sensitive PMT detectors from damage by bright ambient light. Each detector is further protected in its own circuitry should the sample S produce an output of unusually high intensity. As shown in FIG. 8, the light output of fluorescent sample S in compartment 62 is first passed to at least two emission monochromators 65 each set for fixed or scanned wavelengths. The output from the two emission monochromators 65 passes to at least two photon-counting photomultiplier tubes for detection of the particular wavelength of interest. More than or fewer than two emission monochromators 65 can be employed. Since each monochromator requires at least one photomultiplier tube, the number of photomultiplier tubes therefore necessarily equals the number of emission monochromators 65 employed.

A portion of the collimated dual wavelength beam 110 could alternatively be employed to illuminate a sample S in Koehler fashion of an appropriate compartment 72 of a microscope EPI-illumination station 70. The output from the illuminated sample passes through a barrier filter 76 shown in FIG. 8 for selection of the emission bandpass to be analyzed. The output from bandpass filter 76 is in turn detected by a photon counting photomultiplier tube or video camera 74. If a video camera is employed the output thereof is processed by digital imaging processing circuit 78 which is interactive with computer circuit 80.

Computer circuit 80 preferably comprises a standard IBM-AT. The IBM-PC or XT can also be used, but are not preferred because of their reduced speed and memory capabilities. Computer 80 is preferably employed with standard, commercially available input/output devices such as an 80287 or 8087 numeric data processor available from the Intel Corporation, Santa Clara, Calif.; a monochrome graphics card; a multifunction card for clock, serial port and 384K of additional RAM; an input/output interface; assorted cables and a Lab Master, available from Tecmar, Cleveland, Ohio. The computer system 80 is preferably configured to produce a high resolution graphics display of processed data outputed to a Star SD-15 dot matrix printer (Star Micronics, Irvine, Calif.) or compatible such as the Epson FX-80. The computer system 80 can be employed with standard software to produce certain standard functions, including plotting routines, mathematical plotting operations, and data-processing operations. Special functions include signal radioing for signals derived from each illumination or emission channel, detector grating, and automatic photomultiplier tube dead time correction. The memory and speed of the computer system 80 premits 65,536 datapoints to be observed in real time when using only one illumination channel. Up to 32,768 datapoints can be stored in real time when employing dual illumination radioing. The radioing of each channel 106 and 108 against its reference cell quantum 30 signal does not reduce storage. The dual-channel sampling frequency can be set from 30 Hz to 1,000 Hz. Therefore, dual-channel experiments running at 30 Hz to 1,000 Hz can be run uninterrupted from 32 minutes or almost 33 seconds respectively.

Figure 6:
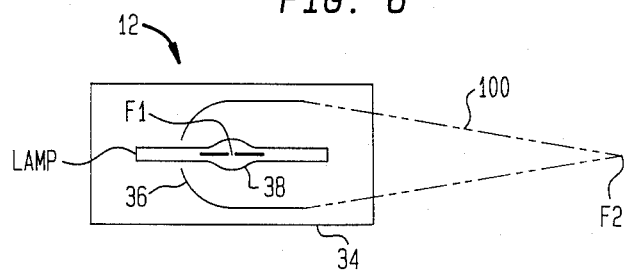
FIG. 6 illustrates a light source employed with the preferred embodiment of the invention illustrated in FIG. 4.

The preferred light source 12 of the present invention is illustrated in FIG. 6. A xenon arc-lamp 38 is placed at one foci $F_1$ of an elliptical mirror 36. Lamp 38 and elliptical mirror 36 are housed inside of chassis 38. The multi-chromatic light beam 100 is focused by an f/4.5 elliptical mirror 36 onto the second foci $F_2$ of the elliptical mirror 36. Elliptical collection mirror 36 acts in place of standard refractory focusing optics. In addition to having six times more collection efficiency than conventional light sources such as illustrated in FIG. 3, the collecting mirror 36 also performs the focusing function thereby permitting the system 10 to incorporate all front surface optics. This in turn means that the system 10 is not wavelength dependent. The significance of the system's unique light source 12 will be further understood in subsequent discussion of the invention 10.

Figure 7:
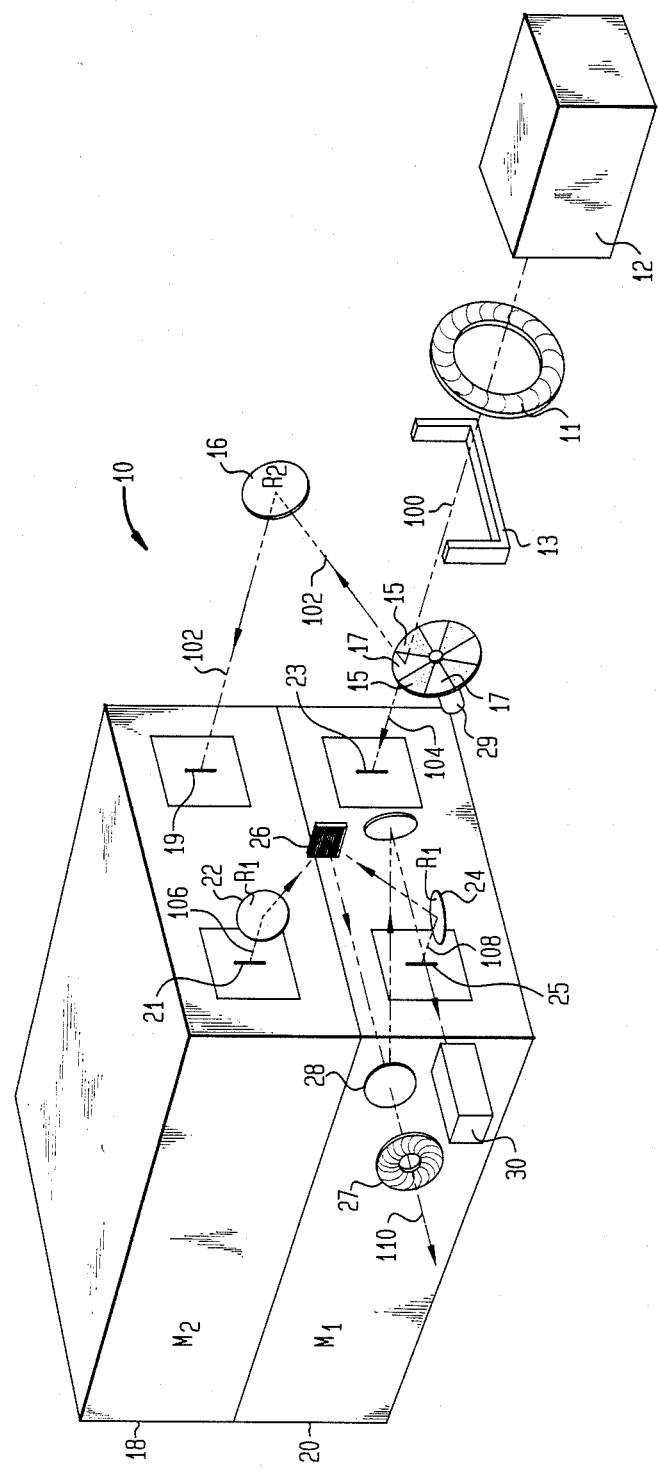
FIG. 7 illustrates the physical layout of the components schematically illustrated in FIG. 4.

The physical layout of the elements which comprise the preferred embodiment of the invention 10 is illustrated in FIG. 7. The xenon arc-lamp light source 12 produces a multi-wavelength light beam 100. An adjustable entrance aperture 11 serves to limit stray light from interfering with the relatively intense, tightly focused beam 100. The lamp 38, illustrated in FIG. 6, preferably comprises a 75 watt xenon arc-lamp centered at the focus $F_1$ of elliptical mirror 36. An order sorting filter may be placed in holder 13 if it is desired to limit the spectra of the multi-chromatic light beam 100.

Light beam 100 impinges upon a rotating, partially reflective optical chopper 14. Optical chopper 14 includes a segmented wheel having five reflective wedge-shaped segments 15 separated by five transparent wedge-shaped segments 17. As previously discussed the light beam 100 has an effective diameter of 4 mm as it passes over a slot arc-length of approximately 28 mm. The relatively small, intense spot size relative to the relatively long arc-length produces a duty cycle that can be in excess of 85%. At chopper speeds of 900 Hz, which translates into a slot exposure time of almost 0.5 msecond, the effective part of the duty cycle becomes approximately 75% if the IBM-AT is employed as the computer system 80. The portion of incoming light beam 100 which strikes a reflective segment 15 is reflected to upper monochromator focusing mirror 16 and into narrow slit 19 of upper monochromator 18 ($M_2$) along path 102. Monochromator 18 separates light from the first multi-chromatic light beam 102 and produces a first monochromatic output light beam 106 emerging from slit 21 which strikes off-axis parabolic collimating mirror 22 and is reflected onto the coarse grating beam combiner 26. Similarly, the light 104 which passes through the transparent segments 17 of chopper 14 is transmitted into the narrow slit 23 of monochromator 20 $M_1$. Monochromator 20 separates the second multichromatic light beam 104 and produces a second monochromatic output light beam 108 which emerges from slit 25 of monochromator 20 and impinges upon a second off-axis parabolic collimating mirror 24. The second off-axis parabolic collimating mirror 24 reflects the second monochromatic light beam 108 onto the surface of the coarse grating beam combiner 26. Coarse grating beam combiner 26 focuses the first and second monochromatic light beam 106 and 108 along a single collimated light beam path 110. Collimating dual wavelength light beam 110 passes through the quartz window beam splitter 28, angled at 20 degrees with respect to beam 110, thereby reflecting a small portion of the light from the total beam into the rhodamine 101 reference cell quantum counter 30 previously described. The output that passes through beam splitter 28 also passes through an adjustable exit aperture 27 and emerges as a collimated dual wavelength light beam 110 that may impinge either a fluorescent sample station 60 or a microscope EPI-illumination station 70 also previously discussed.

Figure 9:
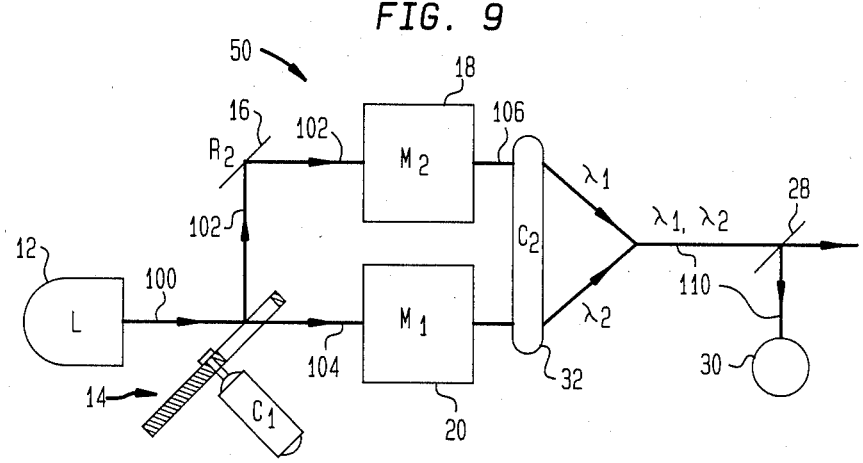
FIG. 9 illustrates an alternative embodiment of the invention illustrated in FIG. 4.

An alternative embodiment 50 of the present invention is illustrated in FIG. 9. The only difference between the preferred embodiment 10 and the alternative embodiment 50 is that the beam combiner mirrors 22 and 24 and the coarse grating 26 have been replaced by a second optical chopper 32 ($C_2$). Optical chopper 32 performs essentially the same function as beam combiner elements 22, 24, and 26 illustrated in FIG. 4. The use of a second chopper 32 in alternative embodiment 50 if synchronized with the first chopper 14 combines the two output beams 106 and 108 thereby substantially enhancing the intensity of the output collimated beam 110.

An understanding of the preferred embodiment of the invention 10 or the alternative embodiment 50 is useful in order to comprehend the significant advantages of the invention over the prior art. In prior art systems such as illustrated in FIG. 1, the use of two conventional light sources means that the efficiency of the prior art system is at least 1/6 as bright as the present invention of embodiments 10 or 50. By increasing the power of the prior art source while trying to illuminate a small area such as a monochromator slit, the brightness will not necessarily increase. This is in part due to the fact that increased power in a prior art system such as illustrated in FIG. 1, may increase the overall energy of the lamp, but may also significantly increase the size of the spot, thereby not significantly increasing the amount of power that falls on any specific unit area.

This in turn means that the illumination power of a prior art system such as shown in FIG. 1 will be substantially below, by a factor of as much as 6 compared to that of the present invention of embodiments 10 or 50. In addition, the fact that conventional lenses are used in such prior art systems as shown in FIG. 1 means that the system will have a certain degree of wavelength dependency. Another problem associated with prior art systems such as shown in FIG. 1 is that no two lamp sources are the same and therefore dual wavelength illumination will introduce a further error factor.

The prior art system of FIG. 2 does not have the balance problem caused by the use of two separate light sources to generate two wavelengths such as found in the prior art system of FIG. 1. However, the prior art system in FIG. 2 requires the use of a beam splitter. By dividing the light from one source into two, the power will necessarily be halved. The beam splitter also introduces another wavelength dependent factor into the system. In contrast to the prior art approach of FIG. 2, the present invention 10 or 50 employs a rotating, partially reflective chopper prior to the monochromators thereby decreasing dead time because the beam is relatively small. This in turn provides for a better signal to noise ratio and improves measurements on a faster time scale. For example, the prior art systems of FIGS. 1 and 2 typically have dead times in excess of 60% and a measurement time scale of more than 200 milliseconds. In contrast to that the present invention of embodiments 10 or 50 has a dead time of less than 20% and a measurement time scale as fast as 1 millisecond.

In summary the present invention has the following advantages:

A. It is approximately 6 times more efficient in light collection compared to prior art systems.

B. More efficient collection permits the use of smaller lamps that are brighter. Brightness as used herein is defined as lumens per unit area per steradian.

C. Since there are not lenses used to match the f number of the light source with that of the monochromator, there is no magnification as in the case of lenses going from f/0.7 to f/4 as shown in FIG. 3. A typical monochromator employs narrow slits to allow for greater resolution. Therefore only the light striking the opening in the slits is transmitted. Since the elliptical mirror 36 of the preferred embodiment focuses a substantially point source from one focus $F_1$ to another $F_2$, there is virtually no magnification of the light, regardless of f number and therefore a relatively small spot is transmitted through the monochromator entrance slit.

D. The two monochromatic light beams 106 and 108 of the embodiments 10 and 50 are better balanced than in prior art systems such as shown in FIGS. 1 and 2. Therefore, the present invention 10 and 50 is better suited to make much more sensitive measurements.

The ellipsoidal light collection system in connection with the reflective chopper is relatively important and unique. The high efficiency of the ellipsoidal collection system together with the high efficiency of the reflective chopper permits for the use of a lower power lamp with a smaller arc size and a higher brightness. In prior art systems, increasing the power of the lamp also increased the size of the arc. Because the present invention can operate with a smaller arc size, the efficient imaging properties of the ellipsoidal collection system yields a smaller image on the chopper and consequently a significantly lower dead time and higher efficiency for time domain multiplexing.

The time domain multiplexing of the light source to the two wavelength selection monochromaters is unique in that it is an especially efficient use of a given light source and that it permits efficient time domain demultiplexing, i.e., the recombination of the two beams by a second chopper or optical grating.

The existence of a collimated, rather than a focused beam, at the exit of the illumination section of the invention is important because this type of beam is a standard for microscope illumination and because this type of beam makes the sample illumination conditions a function of the sample compartment and allows for variation with exchange of the sample compartment.

The synchronization of the data collection from photomultipliers with the light alternation from the chopper through the use of a programmable computer minimizes cross talk and maximizes signal.

While the invention has been described with reference to the preferred embodiment thereof, it will be appreciated by those skilled in the art that various changes may be made to the structure and parts that comprise the invention without departing from the spirit and scope of the invention as a whole.

We claim:

1. A dual-wavelength spectrophotometry apparatus comprising:

a multi-chromatic light source for generating a multi-chromatic light source beam;

chopper means for producing a first and a second multi-chromatic light beam from said multi-chromatic light source beam, said chopper means including a rotatable wheel having mirrored reflective segments thereon alternatively separated by substantially transparent segments through which said multi-chromatic light source beam passes in one direction only;

first monochromatic means for receiving said first multi-chromatic light beam and for producing a first substantially monochromatic light beam having a first wavelength;

second monochromatic means for receiving said second multi-chromatic light beam and for producing a second substantially monochromatic light beam having a second wavelength different from said first wavelength;

combining means for combining said first and second substantially monochromatic light beams into a single columated dual wavelength-light beam that varies alternately between said first and second wavelengths;

a first mirror for reflecting said first multi-chromatic light beam from said rotatable wheel into said first monochromatic means;

a second mirror for reflecting said first substantially monochromatic light beam from said first monochromatic means onto said combining means; and, a third mirror for reflecting said second substantially monochromatic light beam from said second monochromatic means onto said combining means, wherein the location of said chopper means between said multi-chromatic light source and said first and second monochromatic means substantially minimizes the divergence of said multi-chromatic light source beam as it impinges upon said chopper means and maximizes its intensity.

2. The apparatus of claim 1 wherein said first and second monochromatic means comprise first and second monochromators respectively.

3. The apparatus of claim 2 wherein said combining means includes a grating for receiving the reflected first and second substantially monochromatic light beams from said second and third mirrors respectively and for reflecting said first and second substantially monochromatic light beams along the same path.

4. The apparatus of claim 3 wherein said light source comprises:
an arc lamp; and,
a fourth mirror having an ellipsoidal shape,
wherein said arc lamp is centered at one of the foci of said fourth mirror.

5. The apparatus of claim 4 further comprising:
a beam splitter for receiving the dual wavelength collimated light beam from said combining means and splitting said dual wavelength collimated light beam into a first and a second dual wavelength light beam;
sample compartment means for holding a sample of material to be illuminated by said first dual wavelength light beam; and,
reference cell compartment means for holding reference material for illumination by said second dual wavelength light beam.

6. The apparatus of claim 5 further comprising:
detection means for detecting the effect of the illumination of said first dual wavelength beam upon said sample; and,
computer means for analyzing the output from said detection means and for controlling the synchronization of said chopper means with respect to said detector means.

7. The apparatus of claim 6 wherein the illumination exposure times of said sample by said first dual wavelength beam are in the range of 0.5 to 100 m second and the effective dual-wavelength measurements are made in the range of up to 85% of the duty cycle of said chopper means.

8. The apparatus of claim 1 wherein said first and second monochromatic means comprise first and second wavelength selective filters respectively.

9. A method for producing a high duty cycle, small cross-section dual-wavelength colaumated spectrophotometry beam comprising the steps of:
providing a multi-chromatic light source beam from a multi-chromatic light source;
chopping said multi-chromatic light source beam to produce a first and a second multi-chromatic light beam by reflecting a portion of said multi-chromatic source light beam off of a mirrored segment of a rotating wheel to form said first multi-chromatic light beam, transmitting a portion of said multi-chromatic source light beam in one direction only through a transparent segment of a rotating wheel to form said second multi-chromatic light beam;
monochromatically separating a second substantially monochromatic light beam having a second wavelength different from said first wavelength from second multi-chromatic light beam; and,
combining said first and second substantially monochromatic light beams into a single dual-wavelength colaumated light beam that varies alternatively between said first and second wavelengths
wherein the chopping of said multi-chromatic light source beam between said multi-chromatic light source and the monochromatic separation of said first and second substantially monochromatic light beams substantially minimizes the divergence of said multi-chromatic light source beam as it impinges on said rotating wheel and maximizes its intensity.

* * * * *